United States Patent
Li et al.

(10) Patent No.: US 8,751,677 B2
(45) Date of Patent: Jun. 10, 2014

(54) SYSTEM AND METHOD TO SUPPORT DIFFERENT INGEST AND DELIVERY SCHEMES FOR A CONTENT DELIVERY NETWORK

(75) Inventors: Hongbing Li, Belle Mead, NJ (US); Peng Zhang, Beijing (CN); Yunchao Gao, Beijing (CN); Ye-Kui Wang, Bridgewater, NJ (US); Yue Chen, San Jose, CA (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 566 days.

(21) Appl. No.: 12/832,828

(22) Filed: Jul. 8, 2010

(65) Prior Publication Data
US 2011/0087794 A1    Apr. 14, 2011

Related U.S. Application Data

(60) Provisional application No. 61/249,848, filed on Oct. 8, 2009.

(51) Int. Cl.
*G06F 15/16* (2006.01)

(52) U.S. Cl.
USPC .......................................... 709/231; 709/230

(58) Field of Classification Search
CPC ... H04N 5/765; H04N 9/8211; H04N 21/222; H04N 21/23106; H04N 21/2343; H04N 21/23439; H04N 21/25808; H04N 21/26216; H04N 21/84; H04N 21/8451; H04N 21/8456; H04N 21/85406

USPC .................................................. 709/230, 231
See application file for complete search history.

(56) References Cited

U.S. PATENT DOCUMENTS

| | | | |
|---|---|---|---|
| 6,262,777 B1 | 7/2001 | Brewer et al. | |
| 7,073,011 B2 | 7/2006 | Lisitsa et al. | |
| 7,302,490 B1 | 11/2007 | Gupta et al. | |
| 7,464,170 B2 * | 12/2008 | Yokoyama | 709/231 |
| 7,536,469 B2 | 5/2009 | Chou et al. | |
| 2007/0130498 A1 * | 6/2007 | Hannuksela et al. | 715/500.1 |
| 2007/0143807 A1 | 6/2007 | Suneya | |
| 2007/0266446 A1 | 11/2007 | Aaron | |

(Continued)

FOREIGN PATENT DOCUMENTS

| | | |
|---|---|---|
| CN | 101427579 A | 5/2009 |
| WO | WO2006/041260 | 4/2006 |
| WO | WO2009/000631 | 12/2008 |
| WO | WO 2009/020552 A1 | 2/2009 |

OTHER PUBLICATIONS

International Search Report and Written Opinion of the International Searching Authority, PCT/CN2010/076958, Huawei Technologies Co., Ltd. et al., mailing date Dec. 30, 2010, 10 pages.

(Continued)

*Primary Examiner* — David X Yi
(74) *Attorney, Agent, or Firm* — Slater & Matsil, L.L.P.

(57) ABSTRACT

In accordance with an embodiment, a method of operating a computer server includes receiving streaming media data. The streaming media data includes content fragments and a media description file, and the media description file includes metadata describing the content fragments. The method also includes storing the content fragments in a cache.

21 Claims, 6 Drawing Sheets

(56) References Cited

U.S. PATENT DOCUMENTS

| | | | |
|---|---|---|---|
| 2008/0086570 A1 | 4/2008 | Dey et al. | |
| 2008/0195743 A1 | 8/2008 | Brueck et al. | |
| 2009/0225463 A1* | 9/2009 | Itoh et al. | 360/55 |
| 2009/0300204 A1* | 12/2009 | Zhang et al. | 709/231 |
| 2009/0328228 A1* | 12/2009 | Schnell | 726/26 |
| 2010/0235528 A1* | 9/2010 | Bocharov et al. | 709/231 |

OTHER PUBLICATIONS

3GP and 3G2—Wikipedia, the free encyclopedia, http://en/wikipedia.org/w/index.php?title=3gp_3G2&oldid=307343285, Aug. 11, 2009, 4 pages.

"Baseline Architecture and Definitions of HTTP Streaming," Qualcomm Europe S.A.R.L., 3GPP TSG-SA4 #55, Aug. 17-21, 2009, S4-090603, 12 pages.

European Communication, EP 10821583.1-2223, PCT/CN2010/076958, Huawei Technologies Co. Ltd., mailing date Jun. 1, 2012, 9 pages.

"Storage for HTTP Streaming," Huawei Technologies Co., Ltd., TSG-SA4#55 meeting, Aug. 17-21, 2009, Tdoc S4 (09) 0651, 6 pages.

Fröjdh, P., et al., "Adaptive Streaming within the 3GPP Packet-Switched Streaming Service," IEEE Network, Mar.-Apr. 2006, pp. 34-40, vol. 20, Issue: 2.

Russian Office Action received in Application No. 2012118695, mailed Nov. 18, 2013, 10 pages.

Ghosh, Jit, "Enhancing Silverlight Video Experiences with Contextual Data," MSDN Magazine, http://msdn.microsoft.com/en-us/magazine/ee336025.aspx, Jan. 4, 2014, 14 pages.

Pantos, R., "HTTP Live Streaming, draft-pantos-http-live-streaming-02," Apple Inc., Internet—Draft, Intended status: informational, Oct. 5, 2009, 21 pages.

Silverlight Developer Center, "Looking for a sample IIS smooth streaming contents files for Expression Encoder 3," http://social.msdn.microsoft.com/Forums/silverlight-en-US/941939C3-27ce-4486-ab0d-4fac6993aa36/looking-for-a-sample-iis-smooth-streaming-contents-files-for-expression-encoder-3, Jan. 4, 2014, 6 pages.

First Office Action, Chinese Application No. 201080026286.0; Jun. 18, 2013, 23 pages (including partial translation).

European Office Action received on Application No. 108215831, mailed Aug. 30, 2013, 4 pages.

Chinese Office Action received in Chinese Application No. 201080026286.0 dated Feb. 18, 2014, 7 pages.

* cited by examiner

```xml
<?xml version="1.0"?>
<SMIL xmlns="http://www.w3.org/2001/SMIL20/Language">
  <head>
    <meta name="duration" content=""/>
    <meta name="fragmentLength" content=""/>
    <meta name="fragmentCount" content=""/>
    <meta name="SilverlightClientManifest" content=""/>
  </head>
  <body>
    <switch>
      <par>
        <switch>
<!-- Each video is one complete video stream with fragmentation -->
          <video src="" systemBitRate="" systemScreenSize="">
            <param name="videoTrackID" value="" valuetype="data"/>
            <param name="sampleDescription" value="" valuetype="data"/>
          </video>
          ...
        </switch>
        <switch>
<!-- Each audio is one complete audio stream with fragmentation -->
          <audio src="" systemBitRate="" systemLanguage="">
            <param name="codec" value="" valuetype="data"/>
            <param name="channels" value="" valuetype="data"/>
            <param name="audioTrackID" value="" valuetype="data"/>
            <param name="sampleDescription" value="" valuetype="data"/>
          </audio>
          ...
        </switch>
      </par>
<!-- Here, each video means one interleaved ISO file for HTTP download
-->
<!-- w/o progressive. The src of video only contains the prepared
"ftyp" -->
<!-- + "moov", the "mdat" part will be assembled from video fragments
-->
<!-- and audio fragments in Cache -->
      <video src="" systemBitRate="">
        <param name="videoTrackID" value="" valuetype="data"/>
        <param name="audioTrackID" value="" valuetype="data"/>
        <param name="fileSize" value="" valuetype="data"/>
      </video>
      ...
    </switch>
  </body>
</SMIL>
```

Figure 5

SYSTEM AND METHOD TO SUPPORT DIFFERENT INGEST AND DELIVERY SCHEMES FOR A CONTENT DELIVERY NETWORK

CROSS REFERENCE TO RELATED APPLICATIONS

This patent application claims priority to U.S. Provisional Application No. 61/249,848 filed on Oct. 8, 2009, entitled "System and Method to Support Different Ingest and Delivery Schemes for Content Delivery Network," which application is hereby incorporated by reference herein.

TECHNICAL FIELD

The present invention relates generally to computer networks, and more particularly to a system and method to support different ingest and delivery schemes for a content delivery network.

BACKGROUND

Internet protocol (IP) routing was originally designed for host-to-host communication. Today, however, most Internet traffic is used for content dissemination. As the demand for content, such as streaming video, increases, using the existing Internet infrastructure becomes more challenging, especially with respect to time-sensitive and bandwidth intensive traffic such as streaming audio and video media content.

In an Internet content delivery network, the ingested media content may have different file formats targeted toward different audio codecs and video codecs and different types of media clients such as computers, televisions and mobile handsets. These different types of media clients generally have different requirements with respect to media file formats, codecs, bitrates and so on. For example, a high-definition television system requires higher picture resolution than a cellphone and requires larger media files and higher bitrates. Generally, when different copies of the content are needed for different delivery schemes, multiple copies of the content are saved at the origin server and cached at the edge server of the content delivery system.

The presence of multiple media files, however, results in higher network traffic and lower system performance. For example, in the presence of multiple media files, a cache of a given size will be able to store less video resulting in a higher cache miss rate. From the user's perspective, this can result in periodic interruptions in the streaming media.

What is needed are systems and methods of improving streaming video content delivery.

SUMMARY OF THE INVENTION

In accordance with an embodiment, a method of operating a computer server includes receiving streaming media data. The streaming media data includes content fragments and a media description file, and the media description file includes metadata describing the content fragments. The method also includes storing the content fragments in a cache.

In accordance with a further embodiment, a method of operating a computer server includes receiving source media content and processing the source media content to produce content fragments and a media description file describing the content fragments. The content fragments and the media description file are in a uniform format.

In accordance with a further embodiment, a server system includes an input port, a cache, and a processor. The processor receives a streaming media data from an input port, where the streaming media data includes content fragments and a media description file, and the media description file includes metadata describing the content fragments. The processor also stores the content fragments in a cache, combines a plurality of the content fragments from the cache to produce streaming media content of a particular configuration, and transmits the streaming media content of the particular configuration to a media client.

The foregoing has outlined rather broadly the features of some embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5 illustrates an embodiment media description template;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, a system and method to support different ingest and delivery schemes for a content delivery network. Embodiments of the invention may also be applied to other types of communications systems and networks.

In an embodiment, a system and method to support different ingest and delivery schemes for content delivery network has three stages: a media ingress stage, a caching stage where the media is delivered from the origin server to the edge servers for caching, and a media egress stage. A live video source stream or file is encoded, transcoded or re-encoded into one video coding format, e.g., H.264/AVC, and an audio stream or file is encoded, transcoded or re-encoded into one audio coding format, e.g., AAC, at the media ingress stage. To cope with variations in available network bandwidth, terminal capabilities and user preferences, multiple media alternatives, for example, video contents of varying bit rates, resolutions, frame rates, and languages, are prepared for media adaptation in the media ingress stage. Furthermore, for efficient caching and on demand transcoding in the edge servers, audio and video streams are fragmented in a synchronized manner. In the second stage, a pull or push mode is used for media delivery from the origin server to the edge servers. In either mode, the media content is transported chunk by chunk, wherein each chunk consists of one or more fragments. In an embodiment, the media is stored on edge servers as fragments or chunks of fragments. In the media egress stage, different delivery schemes such as file download, progressive download, HTTP streaming, and RTP/RTSP streaming are supported.

Figure 1:
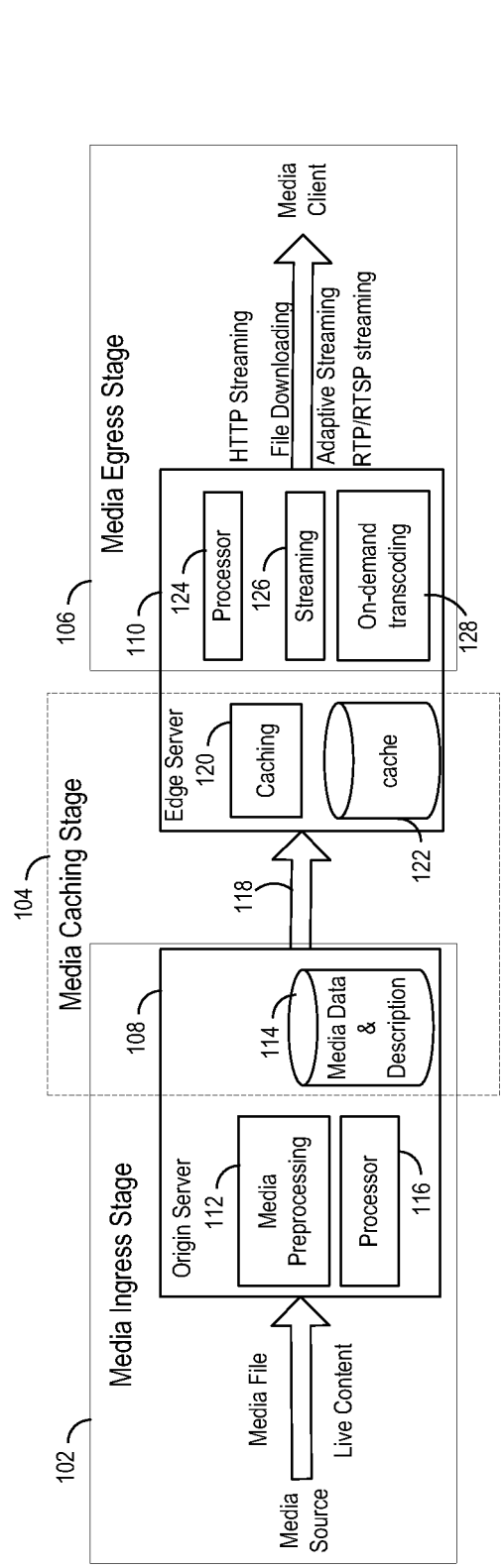
FIG. 1 illustrates an embodiment content delivery system.

FIG. 1 illustrates a content delivery system according to an embodiment of the present invention. Logically, the system has media ingress stage 102, media caching state 104, and media egress state 106. Physically the system has origin server 108 and edge server 110. In an embodiment, origin server 108 and edge server 110 are located in different parts of the network. Alternatively, servers 108 and 110 can be co-located. In an embodiment, one or more origin servers 108 can be in communication with one or more edge servers 110.

In an embodiment, origin server 108 receives a media source, for example, in the form of a media file and/or live content and performs media preprocessing 112 to produce preprocessed media data and description data. The preprocessed media is stored in memory 114, which may also be a hard disk or other storage device, in the form of media data and a description. In an embodiment, media preprocessing is functionally performed by processor 116. Origin server 108 transmits the preprocessed media data and description across network connection 118 to edge server 110. Network connection 118 can be a direct connection, or any type of network connection known in the art, including, but not limited to a wired or wireless connection, Ethernet, Internet I/P connection, or other type of broadband connection.

Edge server 110 receives the preprocessed media data from origin server 108 and stores the data in cache 122 using caching function 120. When needed, streaming function 126 creates streaming data using transcoding function 128, which transcodes the preprocessed media data into a media client target format. In an embodiment, streaming and on-demand transcoding functions are performed by processor 124.

In an embodiment, to improve system management and adaptation efficiency, a uniform media format is used at media caching stage 104. The uniform media format contains a uniform video format, a uniform audio format and a uniform file container format. For instance, in one embodiment, H.264 (video) and Advanced Audio Codec (AAC) is be used as the unified media formats. In alternative embodiments, other formats such as MPEG-2 Video and AAC can be used. In the media ingress stage 102, the video stream is encoded, re-encoded, or transcoded to the uniform video format, e.g. H.264 format, the audio stream is encoded, re-encoded, or transcoded to the uniform audio format, e.g. AAC format, and the file container format is transcoded to a uniform file container format. In one embodiment, the uniform file container format is according to the ISO base media file format. In alternative embodiments, other file formats can be used.

In an embodiment, to deal with variations in available network bandwidth, terminal capabilities and user preferences, multiple media alternatives, for example, video content of varying bit rates, resolutions, frame rates, languages, and so on, are prepared for media adaptation in media ingress stage 102.

Figure 2:
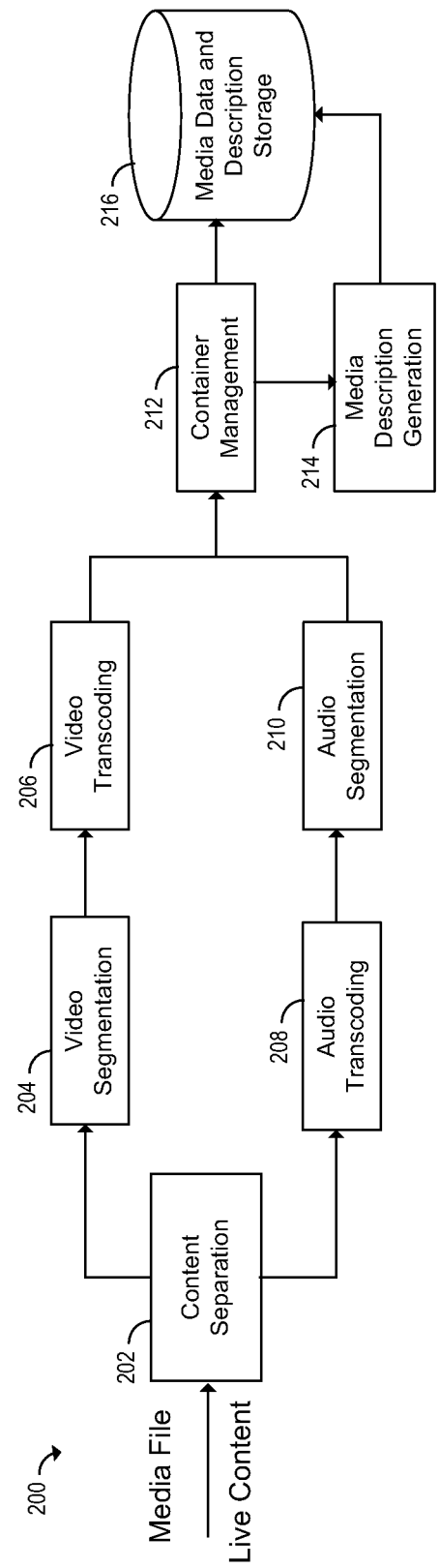
FIG. 2 illustrates an embodiment media preprocessing flow in an embodiment media ingress stage.

FIG. 2 illustrates embodiment media preprocessing flow 200 in an embodiment media ingress stage. Content separation block 202 receives media files or live content and separates the content into video content and audio content. Video content is first segmented 204 and then transcoded 206 when needed, while audio data is first transcoded 208 when needed and then segmented 210. The segmented and, possibly, transcoded video and audio data is processed by container management block 212, and stored in memory 216, which may be a hard disk or other storage device. Media description generation block 214 generates a media description of the audio and video segments, which is also stored in memory 216. In alternative embodiments, the order of segmenting and transcoding can differ from what is illustrated in FIG. 2.

In an embodiment, the audio and video streams are fragmented (i.e. stored as movie fragments as specified in the ISO base media file format) in a synchronized manner. In an embodiment, each video fragment has a fixed time duration, for example 2000 milliseconds, with an exception for the last fragment that contains the remaining video frames and may have a different time duration and/or number of video frames. Alternatively, other fixed or non-fixed time durations can be used. Each video fragmentation contains an integer number of group of pictures (GOPs), for example, exactly one GOP. In an embodiment, each GOP is a closed GOP, which means that the first video frame of the GOP is a random access point, and a fixed length GOP, in either or both of time duration and number of video frames.

In an embodiment, the audio fragments are aligned in time with the video fragments as close as possible. In some embodiments, each audio fragment has an integer number of encoded audio samples. Depending on the audio sampling rate, the audio fragment may not have exactly the same time duration as the corresponding video fragment. In some embodiments, fragmentation processes 204 and 210 are performed to make the time duration of audio fragments as close as possible to that of that of video fragments.

In an embodiment, audio fragments are aligned to video fragments as follows. Assume that $Dv_i$ represents the duration of video fragment i, $Da_{i(n)}$ represents the duration of audio fragment i containing n samples, $Da_{i(n-1)}$ represents the duration of audio fragment i containing n−1 samples, and $Da_{i(n+1)}$ represents the duration of audio fragment i containing n+1 samples. The number of audio samples contained in audio fragment i is then equal to n for which both of the following conditions are met:

$$|Dv_i - Da_{i(n)}| < |Dv_i - Da_{i(n-1)}|, \quad (1)$$

$$|Dv_i - Da_{i(n)}| < |Dv_i - Da_{i(n+1)}|. \quad (2)$$

Figure 3:
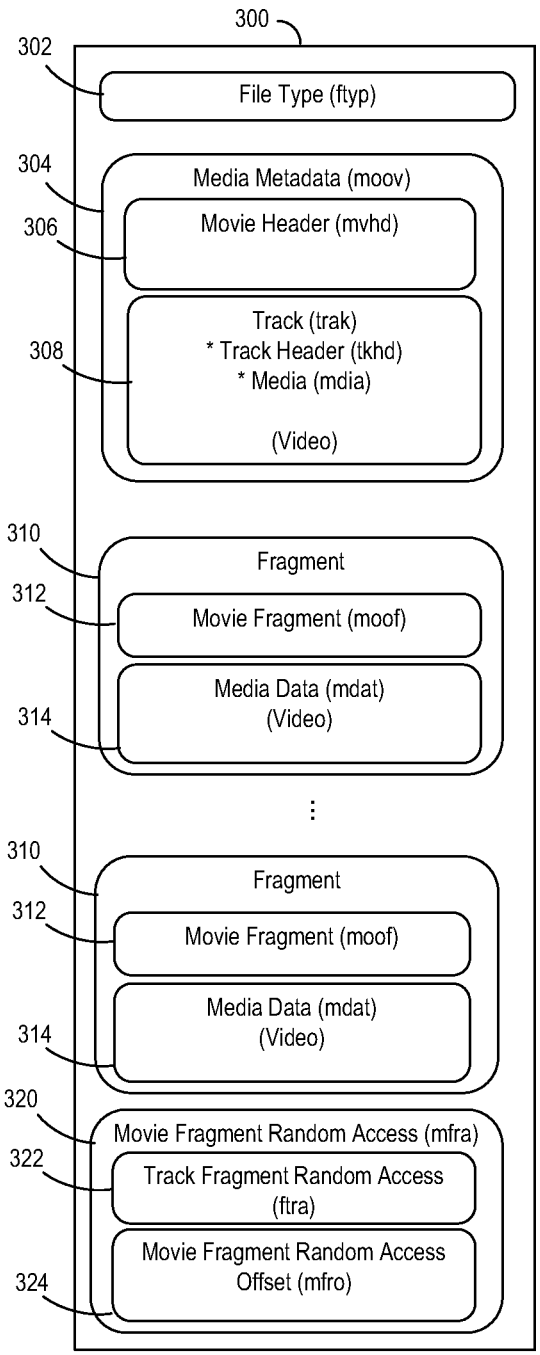
FIG. 3 illustrates an embodiment video format.

On the origin server, to support efficient file management and storage, all fragments belonging to the same content alternative are stored in one track of a file according to the ISO base media file format in one embodiment. For each quality level of the video streams, embodiment video format 300 is depicted in FIG. 3. Video format 300 has file type header 302, media metadata 304, one or more video fragments 310 and movie fragment random access block 320. Media metadata block 304 has movie header 306 and video track header 308, and each fragment 310 has a movie fragment deader 312 and media data 314, which contains the actual video data. Movie fragment random access block 320 has track fragment random access block 322 and movie fragment random access offset block 324.

Figure 4:
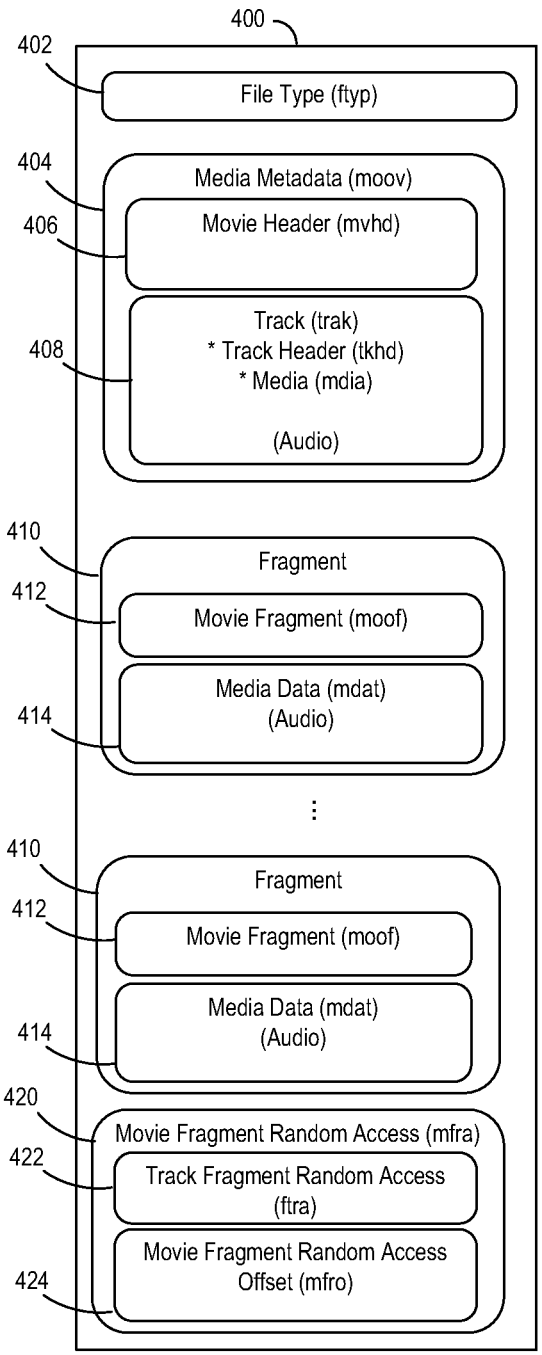
FIG. 4 illustrates an embodiment audio format.

FIG. 4 illustrates embodiment audio stream 400, which is similar to video stream format 300. Audio format 400 has a file type header 402, media metadata 404, one or more audio fragments 410 and movie fragment random access block 420. Media metadata block 404 has movie header 406 and video track header 408, and each fragment 410 has a movie fragment deader 412 and media data 414, which contains the actual audio data. Movie fragment random access block 420 has track fragment random access block 422 and movie fragment random access offset block 424.

In an embodiment, after media preprocessing, there are multiple quality level video files, multiple audio files for the potential different audio codecs, audio channels, audio languages, and quality levels, for example. In an embodiment, one video alternative and one audio alternative is stored in one file.

In an embodiment, a media description file describes the corresponding video streams and audio streams. One example media description template based on SMIL (Synchronized Media Integration Language) is illustrated in FIG. 5.

Figure 6:
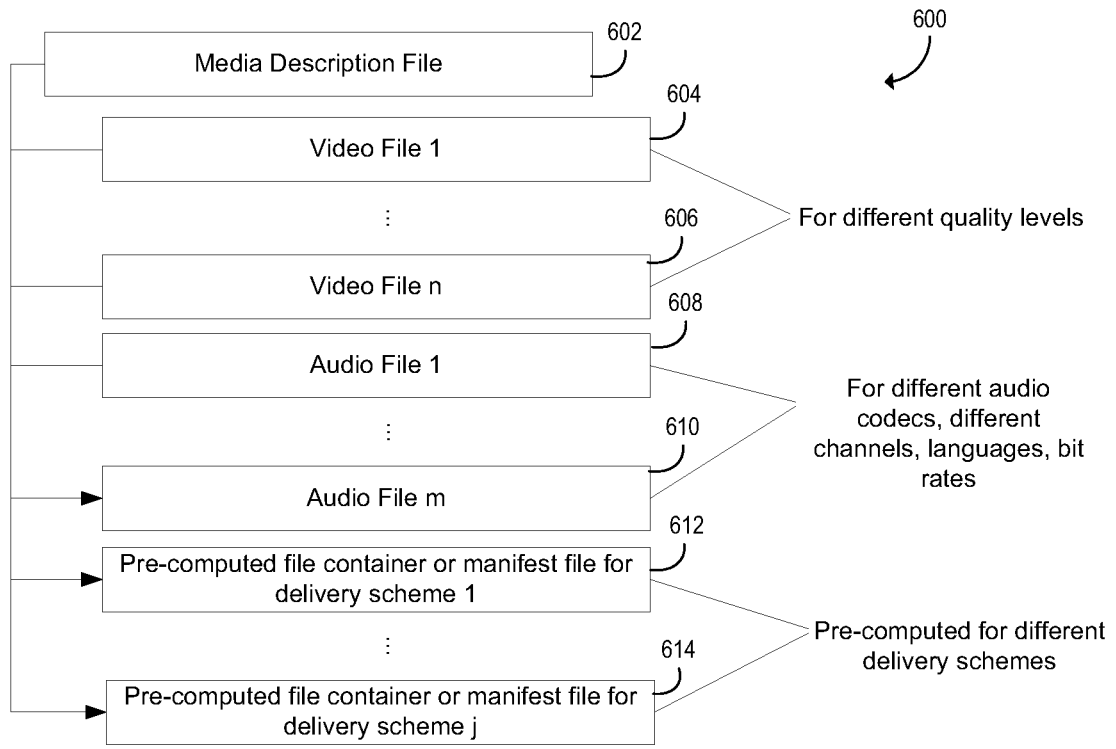
FIG. 6 illustrates an embodiment media data storage scheme.

FIG. 6 illustrates an embodiment storage scheme 600 for preprocessed media data in the media ingress stage. One or more video files 604 and 606 and one or more audio files 608 and 610 are stored under a single media description file 602. In an embodiment, each video file 604 and 606 can represent a different quality level and each audio file 608 and 610 can represent a different target audio codec, channel language, and/or bit rate. One or more pre-computed file container or manifest files 612 and 614 for each delivery scheme is further stored under media description file 602.

In an embodiment caching stage, media content is transported from the origin server to the edge server chunk by chunk, where each chunk is made up of one or more fragments. In an embodiment, the basic transport unit between the origin server and the edge server is a chunk of audio and/or video. In one embodiment, each audio or video chunk is saved as a single file and managed as a single file in the edge server. Alternatively, it is also possible to store one audio chunk and one video chunk in one file in the edge server.

Figure 7:
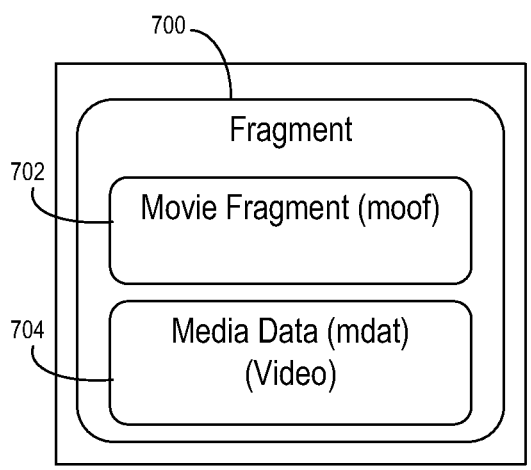
FIG. 7 illustrates an embodiment video fragment format.

FIG. 7 illustrates an embodiment video chunk format 700 having movie fragment 702 and media data 704. In an embodiment, each video chunk contains one video fragment. Alternatively, more than one fragment can be used. In one embodiment, movie fragment 702 is formatted according to the ISO Based Media File Format standard, and contains information about the type, size and location of each sample in the media data 704. In an embodiment, each video fragment is named as "v_xx_yyyyy.frv", where "xx" represents a two digit video track ID, and "yyyyy" represents a five-digit fragment sequence number. For example, "v_01_00001.frv" is the first video fragment of video track 1. In alternative embodiments, other formats and labeling schemes can be used.

Figure 8:
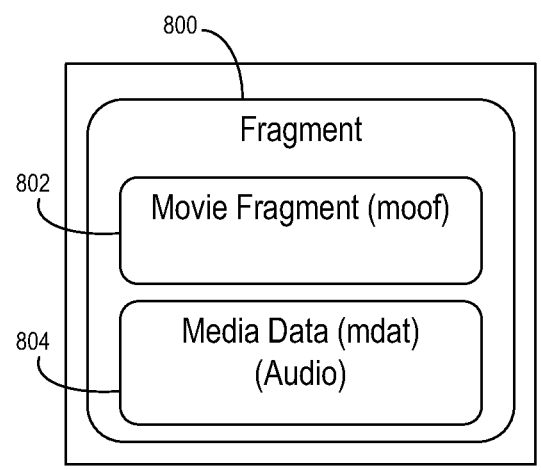
FIG. 8 illustrates an embodiment audio fragment format.

FIG. 8 illustrates an embodiment audio chunk format 800 having movie fragment 802 and media data 804, which is similar to video chunk format 700. In an embodiment, each video chunk contains one audio fragment. In one embodiment, movie fragment 802 is formatted according to the ISO Based Media File Format standard, and contains information about the type, size and location of each sample in the media data 804. In an embodiment, each video fragment is named as "v_xx_yyyyy.fra", where "xx" represents a two digit audio track ID, and "yyyyy" represents a five-digit fragment sequence number. For example, "v_01_00001.fra" is the first audio fragment of audio track 1. In alternative embodiments, other formats and labeling schemes can be used.

Figure 9:
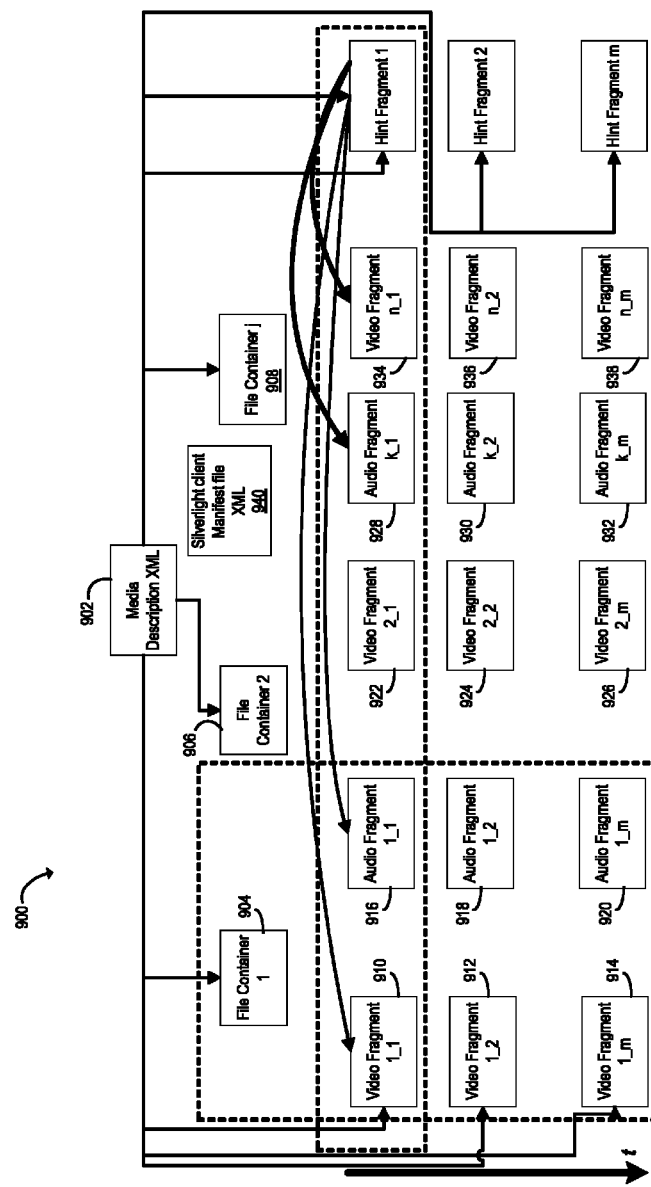
FIG. 9 illustrates an embodiment edge server media storage scheme.

FIG. 9 illustrates an embodiment internal media storage scheme 900 for the edge server of the caching stage. In an embodiment, content is stored under one or more file containers 904, 906 and 908, each of which is indicated in the XML media description 902 and corresponds to one alternative of the content. In an embodiment, XML media description 902 is formatted according to the SMIL template illustrated in FIG. 5. Each file container 904, 906 and 908 has one or more associated video and/or audio fragment files. In one embodiment, fragment files 910, 912, 914, 916, 918 and 920 under file container 1 (904) represent video and audio of a first alternative of the content. Fragments 922, 924, and 926 under file container 2 (906) and fragments 928, 930, 932, 934, 936 and 938 under file container j (908) represent fragments of other alternatives of the content. In an embodiment, the alternatives of the content are created at the origin server. Alternatives of the content can be generated according to a number of parameters such as ingested content quality on the origin server side, and client side variables such as network bandwidth, CPU capabilities, screen resolution and/or end-user configuration. In an embodiment, there are j file containers and m fragments. In an embodiment, each video fragment is labeled according to n_m, where n is the number of total video quality level alternatives, and each audio fragment is labeled according to k_m, where k is the number of total audio track alternatives.

In an embodiment, manifest files are defined for particular streaming technologies. For example, FIG. 9 has Silverlight client Manifest file XML 940, which is a manifest file formatted for Microsoft Silverlight smooth streaming. In alternative embodiments, other manifest files for other streaming technologies, such as Adobe Flash can be used.

In an embodiment media egress stage, different quality level video fragments and different codec audio fragments with different audio channels are combined to support different delivery schemes and meet the requirements of different access network bandwidth and terminal capabilities.

For example, the embodiment of FIG. 9 supports Microsoft Silverlight Smooth Streaming. Here Silverlight Smooth Streaming uses one manifest file with fragmented audio and video being delivered to the client playback device one by one, and uses quality level and start time for requesting specific audio and video fragments. In an embodiment, the quality level is mapped to the audio and video track ID, and the start time is mapped to fragment sequence number. With the audio/video track ID and fragment sequence number, the corresponding a_xx_yyyyy.fra or v_xx_yyyyy.frv fragment file in cache is directly delivered to Silverlight client for playback. In an embodiment, hint fragments shown in FIG. 9 contain information that can be used to assist forming of MPEG-2 Transport Stream packets out of the audio and video fragments.

Figure 10:
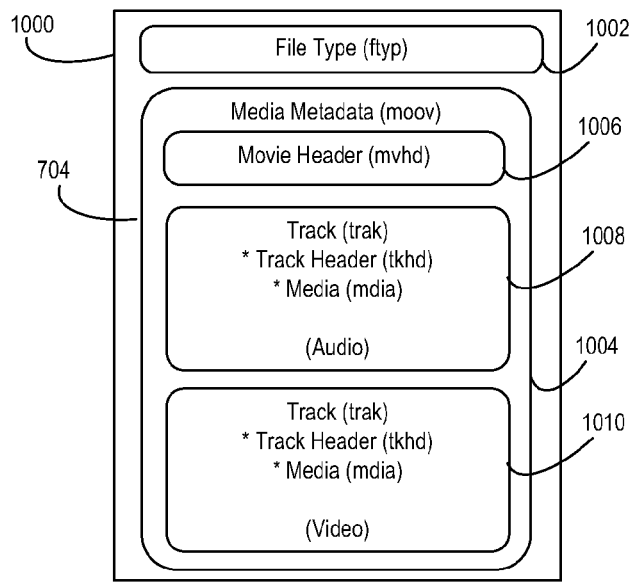
FIG. 10 illustrates an embodiment file container format.

FIG. 10 illustrates embodiment file container 1000. File container 1000 has file type header 1002 and media metadata 1004. Media metadata 1004 has movie header 1006, audio track header 1008 and video track header 1010.

Figure 11:
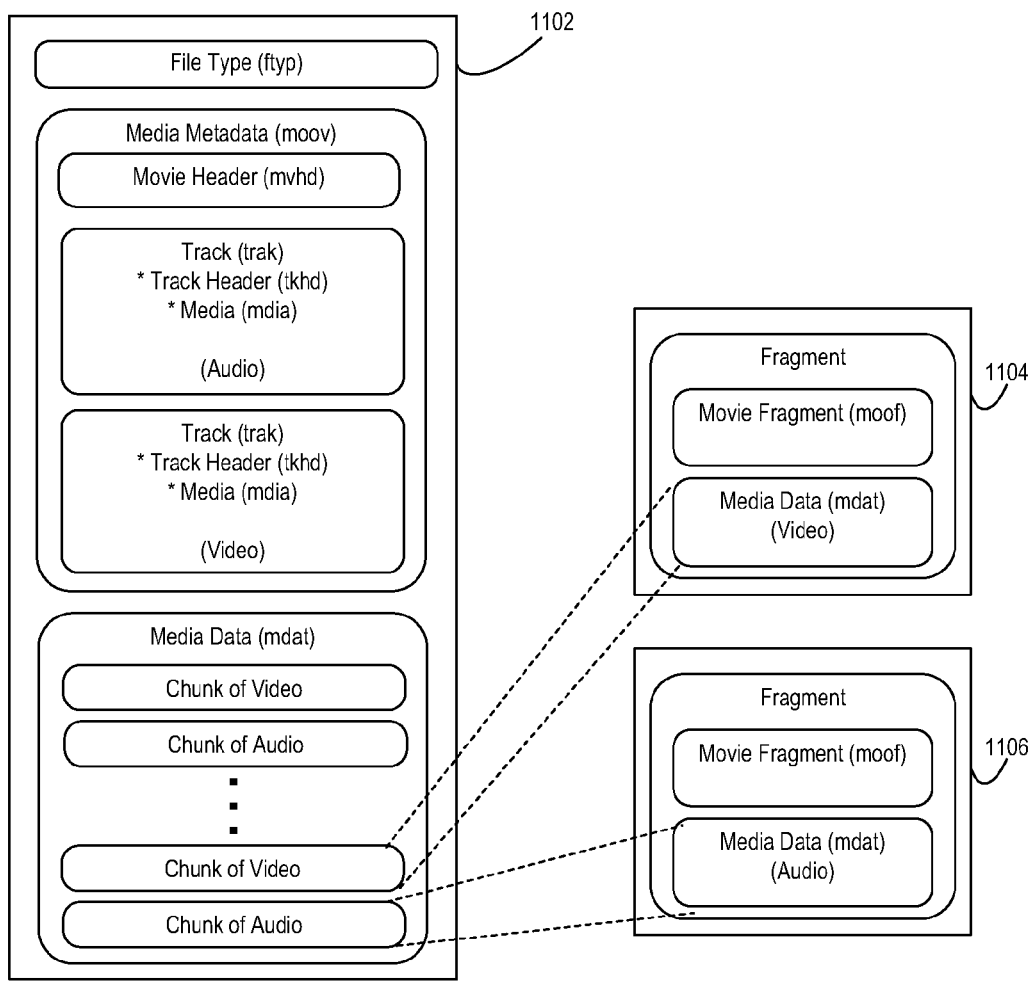
FIG. 11 illustrates an example of assembling a file according to an embodiment.

In an embodiment, file downloading and HTTP progressive downloading, which use interleaved complete file, are performed as follows. With video fragment 700 illustrated in FIG. 7, audio fragment 800 illustrated in FIG. 8 and file container 1000 illustrated in FIG. 10, one complete MP4 file for file downloading and HTTP progressive download is assembled as illustrated in FIG. 11. Here the egress stage generates the MP4 file 1102 by assembling file header and metadata information from the file container, and actual video and audio data from fragments 1104 and 1106.

In an embodiment, a unified internal codec and container format is used. In a media ingress stage, a live video source stream or file is encoded, transcoded or re-encoded into one video coding format, e.g., H.264/AVC, and any audio stream or file is encoded, transcoded or re-encoded into one audio coding format, e.g., AAC. In the media egress stage, different delivery schemes including file download, progressive download, HTTP streaming, and RTP/RTSP streaming are supported from the chunk based video and audio chunks on the edge server.

In an embodiment, a method of storing unified content (with or without alternative video tracks, audio tracks) and metadata support different delivery schemes. As depicted in FIG. 6, some file containers or manifest files can be prepared in the media ingress stage.

In an embodiment, a flexible storage and delivery scheme uses media stream fragmentation and a multi-layer file management scheme. At different stages of a content delivery system, the media stream is manifested in different sizes. Using such embodiment, for example, provides for efficient management of data and high performance streaming. For instance, in the embodiment system depicted in FIG. 1, media data are stored as a single stream per audio or video in the origin server for ease of management, while the basic storage unit is an audio or a video chunk in the edge server. The chunk based storage scheme at the edge server offers real time on demand transcoding capability via parallel media processing.

In an embodiment, a compact media description scheme is combined with a naming rule for video fragments and audio fragments. The media description scheme enables a system to efficiently locate requested video fragments and audio fragments based on quality level and time or byte range from cache or from origin server when a cache miss occurs.

Although the embodiments and their advantages have been described in detail, it should be understood that various changes, substitutions and alterations could be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving streaming media data, the streaming media data comprising a first plurality of alternative content fragments, a second plurality of alternative content fragments, and a single media description file comprising metadata describing both the first plurality of alternative content fragments and the second plurality of alternative content fragments, wherein the first plurality of alternative content fragments and the second plurality of alternative content fragments carry alternative versions of the same media content,
wherein the first plurality of alternative content fragments comprise a series of leading content fragments having a fixed time duration followed by a trailing content fragment having a variable time duration,
wherein each content fragment in the first plurality of alternative content fragments corresponds to one or more alternative content fragments in the second plurality of alternative content fragments, and
wherein the first plurality of alternative content fragments and the second plurality of alternative content fragments carry the same media content at different bit rates.

2. The method of claim 1, wherein receiving streaming media data comprises receiving streaming media data from one or more servers.

3. The method of claim 1, wherein the streaming media data is in a uniform format.

4. The method of claim 1, wherein the streaming media data comprises video fragments and audio fragments.

5. The method of claim 1, wherein the first plurality of alternative content fragments comprise a series of leading content fragments having a fixed time duration followed by a trailing content fragment having a variable time duration.

6. The method of claim 1, further comprising processing the first plurality of alternative content fragments to produce streaming media content of a particular configuration.

7. The method of claim 6, further comprising transmitting the streaming media content to a network interface.

8. The method of claim 1, wherein each content fragment in the first plurality of alternative content fragments corresponds to one or more alternative content fragments in the second plurality of alternative content fragments.

9. The method of claim 8, wherein the first plurality of alternative content fragments and the second plurality of alternative content fragments carry the same media content at different bit rates.

10. A method comprising:
receiving source media content; and
processing the source media content to produce streaming media data, the streaming media data comprising a first plurality of alternative content fragments, a second plurality of alternative content fragments, and a single media description file comprising metadata describing both the first plurality of alternative content fragments and the second plurality of alternative content fragments, wherein the first plurality of alternative content fragments and the second plurality of alternative content fragments carry alternative versions of the same media content,
wherein the first plurality of alternative content fragments comprise a series of leading content fragments having a fixed time duration followed by a trailing content fragment having a variable time duration,
wherein each content fragment in the first plurality of alternative content fragments corresponds to one or more alternative content fragments in the second plurality of alternative content fragments, and
wherein the first plurality of alternative content fragments and the second plurality of alternative content fragments carry the same media content at different bit rates.

11. The method of claim 10, further comprising transmitting the streaming media data to one or more edge servers.

12. The method of claim 10, wherein processing the source media content comprises:

separating the source media content into audio media content and video media content; and
transcoding the audio media content and video media content into a uniform format;
fragmenting the video media content into video fragments; and
fragmenting the audio media content into audio fragments.

13. The method of claim 12, wherein the audio fragments are aligned in time with the video fragments.

14. The method of claim 12, wherein transcoding the audio media content and video media content into the uniform format comprises:
transcoding the audio media content into an AAC format; and
transcoding the video media content into a H.264 format.

15. The method of claim 10, wherein processing the source media content comprises:
separating the source media content into audio media content and video media content;
segmenting the video media content into video fragments;
transcoding the audio media content into a uniform audio format;
transcoding the video fragments into a uniform video format; and
segmenting the audio media content into audio fragments, the audio fragments temporally corresponding with the video fragments.

16. A server system comprising:
an input port; and
a processor configured to:
receive a streaming media data from an input port, the streaming media data comprising a first plurality of alternative content fragments, a second plurality of alternative content fragments, and a single media description file, wherein the single media description file comprises metadata describing both the first plurality of alternative content fragments and the second plurality of alternative content fragments, and wherein the first plurality of alternative content fragments and the second plurality of alternative content fragments carry alternative versions of the same media content;
process the streaming media data to produce streaming media content of a particular configuration; and
transmit the streaming media content to a media client,
wherein the first plurality of alternative content fragments comprise a series of leading content fragments having a fixed time duration followed by a trailing content fragment having a variable time duration,
wherein each content fragment in the first plurality of alternative content fragments corresponds to one or more alternative content fragments in the second plurality of alternative content fragments, and
wherein the first plurality of alternative content fragments and the second plurality of alternative content fragments carry the same media content at different bit rates.

17. The server of claim 16, wherein streaming media data comprises video fragments and audio fragments.

18. The server of claim 16, further comprising a cache, wherein the processor is further configured to store the first plurality of alternative content fragments and the second plurality of alternative content fragments in the cache.

19. The method of claim 1, further comprising storing the first plurality of alternative content fragments and the second plurality of content fragments in a cache.

20. An apparatus comprising:
an input port; and
a processor configured to:
receive a streaming media data from an input port, the streaming media data comprising a first plurality of alternative content fragments, a second plurality of alternative content fragments, and a single media description file, wherein the single media description file comprises metadata describing both the first plurality of alternative content fragments and the second plurality of alternative content fragments, wherein the first plurality of alternative content fragments and the second plurality of alternative content fragments carry alternative versions of the same media content,
wherein the first plurality of alternative content fragments comprise a series of leading content fragments having a fixed time duration followed by a trailing content fragment having a variable time duration,
wherein each content fragment in the first plurality of alternative content fragments corresponds to one or more alternative content fragments in the second plurality of alternative content fragments, and
wherein the first plurality of alternative content fragments and the second plurality of alternative content fragments carry the same media content at different bit rates.

21. The apparatus of claim 20, wherein the apparatus is a media client.

* * * * *